United States Patent [19]
Notaro et al.

[11] Patent Number: 5,781,390
[45] Date of Patent: Jul. 14, 1998

US005781390A

[54] INTEGRATED SUPPLY PROTECTION

[75] Inventors: Joseph Notaro, Northville; David Frank Swanson, Howell, both of Mich.

[73] Assignee: SGS-Thomson Microelectronics, Inc., Carrollton, Tex.

[21] Appl. No.: 771,644

[22] Filed: Dec. 21, 1996

[51] Int. Cl.$^6$ .................................................. H02H 3/18
[52] U.S. Cl. .............................. 361/84; 361/91; 307/127
[58] Field of Search .............................. 361/84, 86, 88, 361/91, 111, 18; 307/10.7, 127

[56] References Cited

U.S. PATENT DOCUMENTS

| | | |
|---|---|---|
| 5,196,980 | 3/1993 | Carson ............... 361/18 |
| 5,410,441 | 4/1995 | Allman ............... 361/18 |
| 5,434,739 | 7/1995 | Heck ................. 361/84 |
| 5,539,610 | 7/1996 | Williams et al. ..... 361/246 |

Primary Examiner—Jeffrey A. Gaffin
Assistant Examiner—Michael Sherry
Attorney, Agent, or Firm—Theodore E. Galanthay; Lisa K. Jorgenson; Renee M. Larson

[57] ABSTRACT

An electrical power protection integrated circuit provides protection against reverse battery and overvoltage conditions that is particularly of value in automotive applications in which reverse battery and overvoltage conditions are commonplace. The electrical power protection integrated circuit device contains a reverse battery condition protection element, supplied either directly or indirectly from a battery power source, that protects against a reverse battery condition of the battery power source and an overvoltage protection element coupled to the reverse battery condition protection device that protects against an overvoltage condition of the battery power source and produces a protected power output that is isolated from both battery overvoltage and reverse battery voltage conditions. Additionally, the integrated circuit device can further produce an auxiliary protected power output that is isolated from reverse battery voltage conditions.

37 Claims, 1 Drawing Sheet

INTEGRATED SUPPLY PROTECTION

BACKGROUND OF THE INVENTION

The present invention relates generally to electrical power protection circuits, and more specifically to electrical power protection circuits as utilized in automotive applications.

The need to protect electrical circuits and systems from power anomalies is well known to the art. All electrical apparatus have limitations on the type and range of prime electrical power from which it will operate, and whenever prime electrical power exceeds those limits special precautions must be employed in order to assure proper apparatus performance.

Among the more common types of prime power anomalies are overvoltage conditions, undervoltage conditions, reverse battery conditions, power outages, and noise. Overvoltage and reverse battery conditions are especially bad in that they can cause equipment damage when they occur.

In many applications, and especially in automotive applications, electrical devices and circuits are required to withstand severe main direct current (DC) power overvoltage conditions without suffering damage, and in some cases to provide uninterrupted operation. The application of reverse battery power is also fairly common in automotive applications. It is a normal design precaution to provide some form of power conditioning between the main power source and the electrical device to either eliminate or to adequately control these undesired power conditions.

Power line conditioning in the prior art has been accomplished using discrete electrical components, integrated circuits, and hybrid implementations. Some power integrated circuits have overvoltage protection integrated on-chip, but in the prior art this has had the disadvantage of being very silicon consuming thereby adding cost. The integrated circuit signal power output stage also has to be designed to withstand these higher voltages with the result that certain device properties are degraded, such as Vce (sat) and Rds (on). Often additional external discrete components, such as high-power zener diodes, have to be included to absorb voltage spikes that would otherwise damage other low voltage digital/analog circuitry present in the electrical circuit. These external components add size, cost and can increase power inefficiency.

With regard to reverse battery conditions, in the various prior art circuit topologies (low/high side, half/full bridge) very large currents may flow in the power device parasitic body diode or free-wheeling diode when driving heavy inductive or low resistive loads. The components used in the electrical circuitry must be designed to withstand the expected reverse battery conditions with no damage, and in prior art this has typically meant the use of silicon-consuming integrated circuit structures.

As is well known in the prior art, the aforementioned large currents which flow may damage the load, the power device and/or other electrical components in the circuit. Normally a fuse is inserted, although some discrete prior art solutions use a power MOSFET (Metal Oxide Silicon Field Effect Transistor) on either the supply line side or the ground line side. The power MOSFET is turned on during normal operation and turned off during reverse battery conditions, interrupting current flow. For a power MOSFET on the supply side, a charge pump and logic circuitry is normally required. For the power MOSFET on the ground side, a charge pump may or may not be necessary depending on the minimum supply voltage, but some type of controlling circuitry is needed. A disadvantage of the prior art MOSFET approach for the ground side is undesirable ground bounce effects.

There is thus an unmet need in the art to be able to provide the required power protection circuitry integrated on a single chip which does not require external components or circuitry. Therefore, it would be advantageous in the art to be able to provide a single chip solution which is capable of providing the required protection in automotive applications, which are known to have especially severe overvoltage and reverse battery voltage protection requirements.

SUMMARY OF THE INVENTION

It is therefore an object of the present invention to provide required electrical power protection circuitry on a single chip as an integrated circuit device so that external components or circuitry are not required to implement the electrical power protection circuitry.

It is another object of the present invention to provide electrical power protection circuitry capable of providing protection against overvoltage and reverse battery voltage conditions.

It is yet another object of the present invention to provide electrical power protection circuitry capable of providing protection against overvoltage and reverse battery voltage conditions in automotive applications.

Therefore, according to the present invention, an electrical power protection integrated circuit provides protection against reverse battery and overvoltage conditions that is particularly of value in automotive applications in which reverse battery and overvoltage conditions are commonplace. An electrical power protection integrated circuit contains a reverse battery condition protection element, supplied directly or indirectly from a battery power source, that protects against a reverse battery condition of the battery power source and an overvoltage protection element coupled to the reverse battery condition protection device that protects against an overvoltage condition of the battery power source and produces a protected power output that is isolated from both battery overvoltage and reverse battery voltage conditions. Additionally, the integrated circuit device can further produce an auxiliary protected power output that is isolated from reverse battery voltage conditions.

The reverse battery condition protection element is supplied either directly or indirectly with a battery power source and has a first transistor device, such as a MOSFET, a first driver device coupled to the first transistor device that provides a constant voltage to the first transistor device during a normal operating condition of the electrical power protection circuit, and a switch coupled to the first transistor device and to the first driver device. During a reverse battery condition of the battery power source, the reverse battery condition protection element is inoperative so that no current flows from the battery power source to the overvoltage protection element thereby isolating the protected power output from the battery power source. The first transistor device is turned off by the switch that provides a short condition between the battery power source and the constant voltage produced by the first driver device. The short condition between the battery power source and the constant voltage forces the gate to source voltage of the first transistor device to zero.

The overvoltage protection element is coupled to the reverse battery condition protection device and produces a protected power output and has a second transistor device coupled to the first transistor device that produces the protected power output, a second driver device coupled to the second transistor device that produces a voltage that is provided to the second transistor device, and a regulator device coupled to the second driver device. During an overvoltage condition of the battery power source, the overvoltage protection element operates to maintain the protected power output at a constant value that is isolated from the overvoltage condition of the battery power source. The second transistor device is regulated by the voltage produced by the second driver device that is made constant by the regulator device. Regulation of the second transistor device causes the second transistor device to enter a saturation region of operation so that the second transistor device operates to maintain the protected power output at the constant value.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention describes an integrated circuit that uses new and novel methods for providing a supply voltage that is fully protected against overvoltage and reverse battery conditions.

Figure 1:
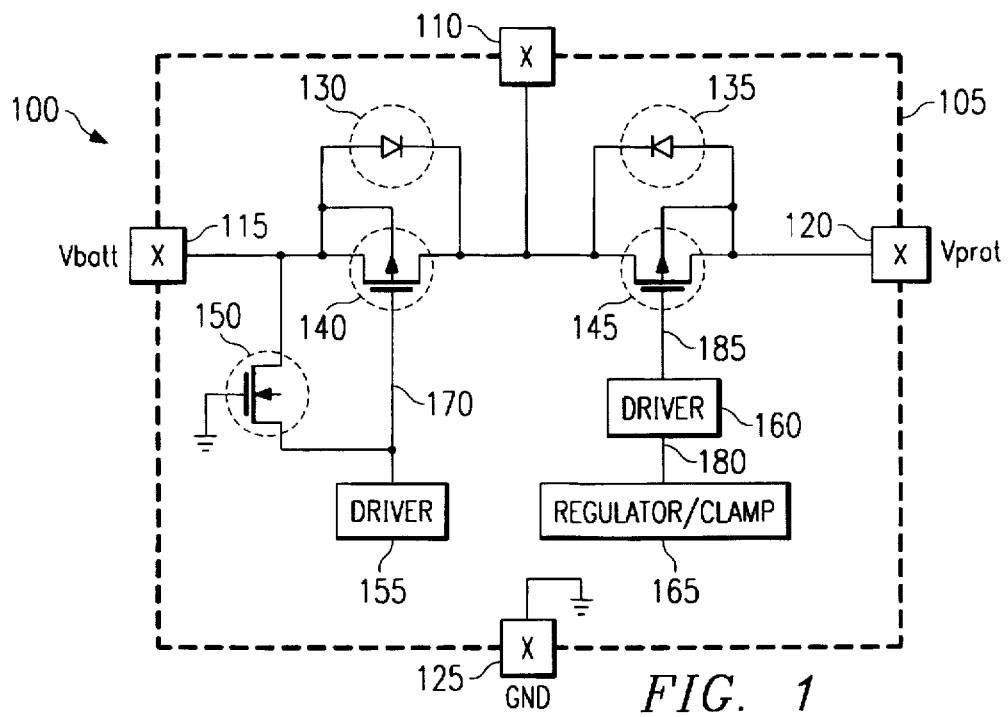
FIG. 1 is a Block Diagram of the Integrated Supply Protection Circuit, according to the present invention.
Figure 2A:
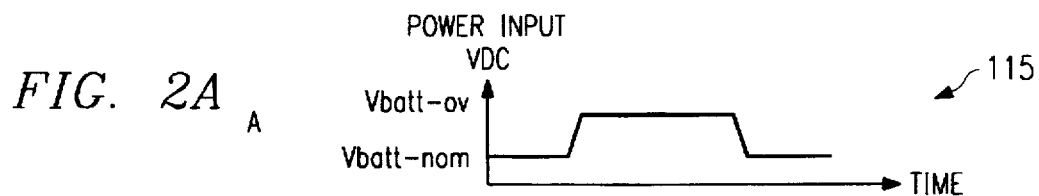
FIG. 2 is a Graph of General Waveforms Occurring During an Overvoltage Transient Condition, according to the present invention.
Figure 2B:
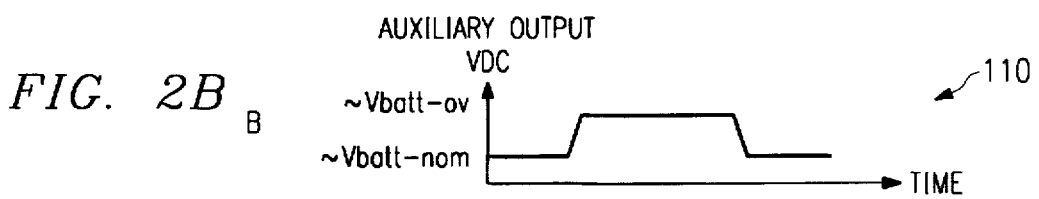
Figure 2C:
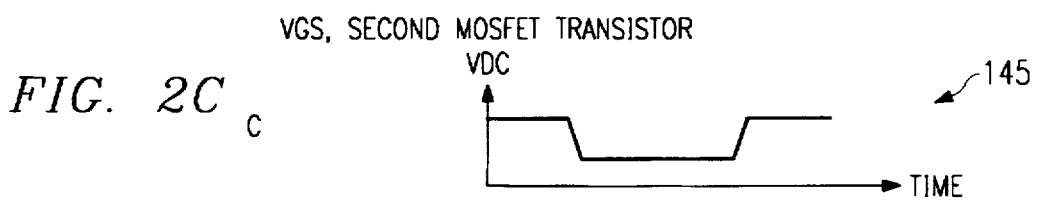
Figure 2D:
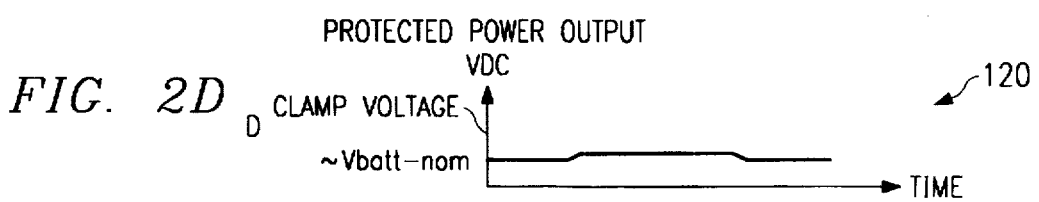

Referring to FIG. 1, an overall block diagram 100 of the Electrical Power Protection Circuit 105 of the present invention is shown. The components of Electrical Power Protection Circuit 105 may be provided on an integrated circuit device and an integrated circuit implementation of the present invention addresses problems of the prior art. The power source, Vbatt, is applied to Power Input 115. The protected voltage output, Vprot, is taken from Protected Power Output 120. The normal current path is from Power Input 115 to First MOSFET Transistor 140 to Second MOSFET Transistor 145 to Protected Power Output 120. First Body Diode 130 and Second Body Diode 135 are body diodes and are integral to First MOSFET Transistor 140 and Second MOSFET Transistor 145, respectively, as shown. First MOSFET Transistor 140 and associated components First Driver 155 and Switch 150 are intended to protect against reverse battery conditions (Vbatt<0). Second MOSFET Transistor 145 and associated components Second Driver 160 and Regulator/Clamp 165 protect against overvoltage conditions which may be present at Power Input 115. Auxiliary Output 110 is provided to make available a power output which is only protected against reverse battery conditions. Ground 125 is the power ground for Electrical Power Protection Circuit 105.

In the case of reverse battery voltage, First MOSFET Transistor 140 is turned off so that no current can flow between Power Input 115 and Auxiliary Output 110. This is accomplished by Switch 150, which provides a short between First Gate Voltage 170 and Power Input 115 during reverse voltage conditions forcing the Vgs (gate to source voltage) of First MOSFET Transistor 140 to be zero. If Vgs=0, First MOSFET Transistor 140 is turned off, and no current can flow from Power Input 115 to Protected Power Output 120. This means that Protected Power Output 120 is isolated from the reverse battery condition applied to Power Input 115.

It should be noted that Switch 150 provides the switching function whereby Power Input 115 and First Gate Voltage 170 are shorted when Vgnd>Vbatt, with these being not shorted otherwise. This switching function is basic and may be accomplished by means other than the FET illustrated for Switch 150, as is well known in the art.

The purpose of First Driver 155 is to maintain a constant voltage at First Gate Voltage 170 so that First MOSFET Transistor 140 is always turned on during normal operation. First Driver 155 would typically be a regulated supply or a charge pump, and various methods are known in the art to provide a constant voltage at First Gate Voltage 170. The voltage at First Gate Voltage 170 will depend upon the device type and will have a value sufficient to ensure that First MOSFET Transistor 140 remains turned on.

Overvoltage transients at Power Input 115 which exceed the nominal Vbatt are passed by First Body Diode 130 or First MOSFET Transistor 140 depending upon which device has the smaller voltage drop and appear on Auxiliary Output 110. The gate of Second MOSFET Transistor 145 is clamped or regulated by the combination of Regulator/Clamp 165, Regulator/Clamp Voltage 180 and Second Driver 160 to a constant value at Second Gate Voltage 185. The result of an overvoltage condition at Auxiliary Output 110 and a constant Second Gate Voltage 185 is that Second MOSFET Transistor 145 enters the saturation region of operation wherein Protected Power Output 120 is maintained at a constant, but increased voltage. In other words, the increased voltage at Auxiliary Output 110 is absorbed by Second MOSFET Transistor 145, appearing as an increase in the voltage differential across Second MOSFET Transistor 145, which maintains Protected Power Output 120 essentially constant and isolated from the overvoltage condition at Power Input 115.

The purpose of the combination of Second Driver 160 and Regulator/Clamp 165 is to maintain a constant voltage at Second Gate Voltage 185 so that Second MOSFET Transistor 140 is always turned on during normal operation but is responsive to overvoltage conditions at Auxiliary Output 110 as previously discussed. Second Driver 160 would typically be a regulated supply or a charge pump, and Regulator/Clamp 165 is a regulator or voltage clamp. Many methods are known in the art to provide a constant Second Gate Voltage 185. Second Gate Voltage 185 will typically depend upon the device type and will have a value sufficient to ensure that Second MOSFET Transistor 145 remains turned on as discussed previously.

As a more detailed explanation of the overvoltage protection mechanism of the present invention, note that an overvoltage condition at Power Input 115 will appear on Auxiliary Output 110, since First MOSFET Transistor 140 is turned on or will have First Body Diode 130 forward biased. If no action is taken, Protected Power Output 120 will follow Auxiliary Output 110. If Second Gate Voltage 185 is maintained at a constant voltage (by Second Driver 160 and Regulator/Clamp 165), as Auxiliary Output 110 increases Protected Power Output 120 will try to follow which will produce a decrease in the Vgs of Second MOSFET Transistor 145. This decrease in Vgs causes the Rds (on) of Second MOSFET Transistor 145 to increase which causes the voltage at Protected Power Output 120 to decrease. This is the mechanism whereby Vprot may be maintained at an essentially constant value.

Referring to FIG. 2, waveform A represents the voltage Vbatt present at Power Input 115 during an overvoltage transient condition. This voltage starts at nominal operating voltage Vbatt-nom, momentarily increasing to overvoltage Vbatt-ov before returning to Vbatt-nom. Waveform B represents the resulting voltage at Auxiliary Output 110, and shows how the overvoltage condition is propagated from Power Input 115 to Auxiliary Output 110. The voltage at Auxiliary Output 110 will be slightly less than Vbatt-ov by the forward voltage drop of First Body Diode 130 or First MOSFET Transistor 140 depending upon which device has the smaller voltage drop. Waveform C shows Vgs of Second MOSFET Transistor 145 during the overvoltage transient, and Waveform D shows how the voltage at Protected Power Output 120 is constrained during the transient. The voltage present at Protected Power Output 120 is [Vbatt-nom-Iload (Rds (on total))] during normal operation, where Iload is the current drawn by the load (not shown) attached to Protected Power Output 120, and Rds (on) (drain to source resistance in an ON-state) total is the Rds (on) of Second MOSFET Transistor 145 summed with the Rds (on) of First MOSFET Transistor 140. During the overvoltage transient, the maximum voltage at Protected Power Output 120 is limited by the value of the clamp voltage on Second Gate Voltage 185.

As is seen from the preceding discussions, the present invention provides protection for electrical devices connected to Protected Power Output 120 from overvoltage and reverse battery voltage conditions which may be present on Power Input 115. This allows a simplification of the circuitry of the electrical devices because they will never see overvoltage or reverse battery voltage conditions. The present invention provides this protection by a novel technique of blocking, not clamping, the overvoltage and reverse battery voltage conditions so as to isolate the protected output. The present invention realizes this protection on a single chip without the need for any external components by using a novel dual power MOSFET structure with back-to-back drains, along with associated control structures.

While the invention has been particularly shown and described with reference to a preferred embodiment, it will be understood by those skilled in the art that various changes in form and detail may be made therein without departing from the spirit and scope of the invention.

What is claimed is:

1. An electrical power protection circuit that provides protection against overvoltage and reverse battery voltage conditions, comprising:
    a reverse battery condition protection element, supplied with a battery power source, that protects against a reverse battery condition of the battery power source; and
    an overvoltage protection element coupled to the reverse battery condition protection device that protects against an overvoltage condition of the battery power source and produces a protected power output, wherein the reverse battery condition protection element comprises:
        a first transistor device;
        a first driver device coupled to the first transistor device that provides a constant voltage to the first transistor device during a normal operating condition of the electrical power protection circuit; and
        a switch coupled to the first transistor device and to the first driver device,
    wherein during the reverse battery condition of the battery power source, the first transistor device is turned off and the reverse battery condition protection element is inoperative so that no current flows from the battery power source to the overvoltage protection element thereby isolating the protected power output from the battery power source.

2. The circuit of claim 1, wherein during the reverse battery condition of the battery power source, the first transistor device is turned off by the switch that provides a short condition between the battery power source and the constant voltage produced by the first driver device.

3. The circuit of claim 2, wherein the first transistor device is a MOSFET transistor and the short condition between the battery power source and the constant voltage forces the gate to source voltage of the first transistor device to zero.

4. The circuit of claim 1, wherein the first transistor device has a body diode.

5. The circuit of claim 1, wherein the switch is a FET (Field Effect Transistor).

6. The circuit of claim 1, wherein the first driver device is a regulated supply.

7. The circuit of claim 1, wherein the first driver device is a charge pump.

8. An electrical power protection circuit that provides protection against overvoltage and reverse battery voltage conditions, comprising:
    a reverse battery condition protection element, supplied with a battery power source, that protects against a reverse battery condition of the battery power source; and
    an overvoltage protection element coupled to the reverse battery condition protection device that protects against an overvoltage condition of the battery power source and produces a protected power output, wherein during an overvoltage condition of the battery power source, the overvoltage protection element operates to maintain the protected power output at a constant voltage that is isolated from the overvoltage condition of the battery power source.

9. The circuit of claim 8, wherein the overvoltage protection element comprises:
    a second transistor device;
    a second driver device coupled to the second transistor device that produces a voltage that is provided to the second transistor device; and
    a regulator device coupled to the second driver device,
    wherein during the overvoltage condition of the battery power source, the second transistor device is regulated by the voltage produced by the second driver device that is made constant by the regulator device and wherein regulation of the second transistor device causes the second transistor device to enter a saturation region of operation so that the second transistor device operates to maintain the protected power output at the constant voltage.

10. The circuit of claim 9, wherein the second transistor device has a body diode.

11. The circuit of claim 9, wherein the second driver device is a regulated supply.

12. The circuit of claim 9, wherein the second driver device is a charge pump.

13. The circuit of claim 9, wherein the regulator device is replaced by a clamp device.

14. An electrical power protection circuit that provides protection against overvoltage and reverse battery voltage conditions, comprising:
    a reverse battery condition protection element, supplied with a battery power source, that protects against a reverse battery condition of the battery power source, wherein the reverse battery condition protection element comprises:
        a first transistor device;
        a first driver device coupled to the first transistor device that provides a constant voltage to the first transistor device during a normal operating condition of the electrical power protection circuit; and
        a switch coupled to the first transistor device and to the first driver device; and
    an overvoltage protection element coupled to the reverse battery condition protection device that protects against an overvoltage condition of the battery power source and produces a protected power output and wherein the overvoltage protection element comprises:
        a second transistor device;
        a second driver device coupled to the second transistor device that produces a voltage that is provided to the second transistor device; and a regulator device coupled to the second driver device.

15. The circuit of claim 14, wherein during a reverse battery condition of the battery power source, the reverse battery condition protection element is inoperative so that no current flows from the battery power source to the overvoltage protection element thereby isolating the protected power output from the battery power source.

16. The circuit of claim 15, wherein during the reverse battery condition of the battery power source, the first transistor device is turned off.

17. The circuit of claim 16, wherein the first transistor device is turned off by the switch that provides a short condition between the battery power source and the constant voltage produced by the first driver device.

18. The circuit of claim 17, wherein the first transistor device is a MOSFET transistor and the short condition between the battery power source and the constant voltage forces the gate to source voltage of the first transistor device to zero.

19. The circuit of claim 14, wherein during an overvoltage condition of the battery power source, the overvoltage protection element operates to maintain the protected power output at a constant voltage that is isolated from the overvoltage condition of the battery power source.

20. The circuit of claim 19, wherein during the overvoltage condition of the battery power source, the second transistor device is regulated by the voltage produced by the second driver device that is made constant by the regulator device and wherein regulation of the second transistor device causes the second transistor device to enter a saturation region of operation so that the second transistor device operates to maintain the protected power output at the constant voltage.

21. The circuit of claim 14, wherein the first transistor device has a body diode and the second transistor device has a body diode.

22. The circuit of claim 14, wherein the first transistor device is a first MOSFET transistor and the second transistor device is a second MOSFET transistor.

23. An electrical power protection integrated circuit that provides protection against overvoltage and reverse battery voltage conditions, comprising:

a reverse battery condition protection element, supplied with a battery power source, that protects against a reverse battery condition of the battery power source wherein the reverse battery condition protection element comprises:

a first transistor device, supplied with a battery power source;

a first driver device coupled to the first transistor device that provides a constant voltage to the first transistor device during a normal operating condition of the electrical power protection circuit; and a switch coupled to the first transistor device and to the first driver device; and an overvoltage protection element coupled to the reverse battery condition protection device that protects against an overvoltage condition of the battery power source and produces a protected power output, wherein the overvoltage protection element comprises:

a second transistor device coupled to the first transistor device that produces a protected power output;

a second driver device coupled to the second transistor device that produces a voltage that is provided to the second transistor device; and a regulator device coupled to the second driver device.

24. The circuit of claim 23, wherein during a reverse battery condition of the battery power source, the reverse battery condition protection element is inoperative so that no current flows from the battery power source to the overvoltage protection element thereby isolating the protected power output from the battery power source; and wherein during an overvoltage condition of the battery power source, the overvoltage protection element operates to maintain the protected power output at the constant voltage that is isolated from the overvoltage condition of the battery power source.

25. The circuit of claim 24, wherein during the reverse battery condition of the battery power source, the first transistor device is turned off.

26. The circuit of claim 25, wherein during the reverse battery condition of the battery power source, the first transistor device is turned off by the switch that provides a short condition between the battery power source and the constant voltage produced by the first driver device.

27. The circuit of claim 26, wherein the first transistor device is a MOSFET transistor and the short condition between the battery power source and the constant voltage forces the gate to source voltage of the first transistor device to zero.

28. The circuit of claim 23, wherein during the overvoltage condition of the battery power source, the second transistor device is regulated by the voltage produced by the second driver device that is made constant by the regulator device and wherein regulation of the second transistor device causes the second transistor device to enter a saturation region of operation so that the second transistor device operates to maintain the protected power output at the constant voltage.

29. The circuit of claim 23, wherein the first transistor device has a body diode.

30. The circuit of claim 23, wherein the second transistor device has a body diode.

31. The circuit of claim 23, wherein the switch is a FET (Field Effect Transistor).

32. The circuit of claim 23, wherein the first driver device is a regulated supply.

33. The circuit of claim 23, wherein the first driver device is a charge pump.

34. The circuit of claim 23, wherein the second driver device is a regulated supply.

35. The circuit of claim 23, wherein the second driver device is a charge pump and a clamp.

36. The circuit of claim 23, wherein the electrical power protection circuit further comprises:

an auxiliary protected power output produced by the reverse battery condition protection element that is protected against a reverse battery condition of the battery power source.

37. The circuit of claim 23, wherein the first transistor device is a first MOSFET transistor and the second transistor device is a second MOSFET transistor.

* * * * *